United States Patent
Shu et al.

(10) Patent No.: US 12,314,286 B2
(45) Date of Patent: May 27, 2025

(54) DISTRIBUTED APPROXIMATE NEAREST NEIGHBOR SERVICE ARCHITECTURE FOR RETRIEVING ITEMS IN AN EMBEDDING SPACE

(71) Applicant: Maplebear Inc., San Francisco, CA (US)

(72) Inventors: Guanghua Shu, Sunnyvale, CA (US); Taesik Na, Issaquah, WA (US); Zhihong Xu, Sunnyvale, CA (US); Wideet Shende, San Francisco, CA (US); Manmeet Singh, Santa Clara, CA (US); Tejaswi Tenneti, Fremont, CA (US); Reza Sadri, Irvine, CA (US)

(73) Assignee: Maplebear Inc., San Francisco, CA (US)

( * ) Notice: Subject to any disclaimer, the term of this patent is extended or adjusted under 35 U.S.C. 154(b) by 42 days.

(21) Appl. No.: 17/682,187

(22) Filed: Feb. 28, 2022

(65) Prior Publication Data

US 2023/0273940 A1    Aug. 31, 2023

(51) Int. Cl.
*G06F 16/28*    (2019.01)
*G06F 11/34*    (2006.01)
(Continued)

(52) U.S. Cl.
CPC ........ *G06F 16/283* (2019.01); *G06F 11/3409* (2013.01); *G06F 16/2228* (2019.01); *G06F 16/24556* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 6,493,762 B1 * | 12/2002 | Chen | H04H 60/06 455/3.01 |
| 2011/0264646 A1 * | 10/2011 | Sokolan | G06F 16/951 707/711 |

(Continued)

OTHER PUBLICATIONS

Cathrin Weiss; Hexastore: Sextuple Indexing for Semantic Web Data Management; PVLDB;pp. 1008-1019 (Year: 2008).*

(Continued)

*Primary Examiner* — Albert M Phillips, III
*Assistant Examiner* — Jermaine A Mincey
(74) *Attorney, Agent, or Firm* — Fenwick & West LLP

(57) ABSTRACT

An online system maintains item embeddings for items. As a number of items maintained by the online system increases, maintaining a single index of the item embeddings is increasingly difficult. To increase scalability, the online system partitions item embeddings into multiple indices, with each index corresponding to a value of a specific attribute maintained by the online system for items. For example, an online system generates indices that each correspond to a different warehouse offering items. To expedite retrieval of item embeddings, the online system allocates each index to one of a number of shards. When the online system receives a query, the online system determines an embedding for the query and retrieves an index from a shard based on metadata received with the query. Based on distances between the query for the embedding and the item embeddings in the retrieved index, the online system selects one or more items.

17 Claims, 7 Drawing Sheets

(51) Int. Cl.
*G06F 16/22* (2019.01)
*G06F 16/24* (2019.01)
*G06F 16/245* (2019.01)
*G06F 16/2455* (2019.01)

(56) References Cited

U.S. PATENT DOCUMENTS

| | | | | |
|---|---|---|---|---|
| 2016/0155141 | A1* | 6/2016 | Song | G06Q 30/0242 |
| | | | | 705/14.41 |
| 2016/0191509 | A1* | 6/2016 | Bestler | H04L 63/0876 |
| | | | | 713/193 |
| 2017/0109398 | A1* | 4/2017 | Stearn | G06F 16/22 |
| 2018/0150552 | A1* | 5/2018 | Wang | G06N 20/20 |
| 2023/0273940 | A1* | 8/2023 | Shu | G06F 16/2228 |
| | | | | 707/600 |

OTHER PUBLICATIONS

Hamid Palangi; Deep Sentence Embedding Using Long Short-Term Memory Networks: Analysis and Application to Information Retrieval; IEEE;2016; pp. 694-707.*

PCT International Search Report and Written Opinion, PCT Application No. PCT/US22/51723, Mar. 6, 2023, 8 pages.

* cited by examiner

DISTRIBUTED APPROXIMATE NEAREST NEIGHBOR SERVICE ARCHITECTURE FOR RETRIEVING ITEMS IN AN EMBEDDING SPACE

BACKGROUND

This disclosure relates generally to retrieving items satisfying a retrieved query, and more specifically to a distributed architecture for maintaining item embeddings to identify items satisfying a received query.

Many online systems, such as online concierge systems, receive queries from users and retrieve items matching or otherwise relevant to the query. For example, an online concierge system receives a query from a user and retrieves items offered by one or more warehouses that satisfy the query. Commonly, online systems compare text information describing items to a received query and retrieve items with text description matching at least a part of the query.

However, such matching of text descriptions with queries may fail to identify certain items or identify items that are less relevant to a user's intent for providing a query. To retrieve items with higher relevance to a query, an online system may use embedding based retrieval to retrieve items. In embedding based retrieval, an online system generates an embedding for a query and generates embeddings for items accessed by, or maintained by, the online system. The embedding for the query represents the query as a multidimensional vector in a latent space, while embeddings for items similarly represent items as multidimensional vectors in the latent space. For a received query, the online system identifies items having embeddings nearest to the embedding for the query in the latent space to retrieve items for the query.

As a number of items maintained or offered by an online system increases, a number of item embeddings maintained by the online system correspondingly increases. When an online system maintains a single database of item embeddings, increasing a number of items increases an amount of storage for an online system to maintain the item embeddings. Further, as a number of item embeddings included in a single database of item embeddings increases, an amount of time for the online system to retrieve items from the item embeddings also increases, lengthening time for the online system to return items satisfying a received query.

SUMMARY

An online system generates item embeddings for items identified in an item database maintained by the online system. For example, the online system is an online concierge system that generates item embeddings for items available through the online concierge system. Additionally, the online system maintains an item database that identifies items. The item database includes an identifier for each item and maintains values for various attributes of the item. For example, an entry in the item database for an item includes an identifier of the item and fields corresponding to each attribute maintained for the item, with a field corresponding to an attribute including a value of the attribute for the item.

To store the item embeddings in a manner that expedites retrieval of item embeddings by the online system, the online system identifies a specific attribute maintained by the item database. The specific attribute may be predetermined by the online system or may be selected by the online system based on one or more rules. The online system uses the specific attributes as an index key and generates different indices that each correspond to a different value of the specific attribute. Each index includes embeddings for items having a value of the specific attribute in the item database matching the value corresponding to the index. Different online systems may select different specific attributes of items included in an item database, allowing different online systems to tailor the number of item embeddings included in different indices as well as the number of indices that are generated.

To further increase scalability of how item embeddings are stored, the online system distributes the indices into a number of shards. The online system determines a number of shards to use based on any suitable criteria. In various embodiments, the number of shards is less than a number of indices that were generated. In some embodiments, the online system uses the value of the specific attribute, a hash function, and the number of shards to allocate an index to a shard based on the value of the specific attribute for the index. In other embodiments, the online system accounts for a frequency with which different indices are accessed by the online system to load balance accesses to different shards based on the frequency with which indices stored in a shard are accessed, allowing the online system to load balance access to different shards. Hence, a shard may include multiple indices in various embodiments. The online system may modify allocation of indices to shards based on a frequency with which different shards are accessed, allowing the online system to load balance access to different shards over time to account for changes in frequencies with which the online system retrieves item embeddings from different indices over time.

With the indices stored in shards, when the online system receives a query from a user, the online system generates an embedding for the query. From metadata received in conjunction with the query, the online system identifies a shard including an index relevant to the query. In some embodiments, the online system maintains associations between an identifier of an index and a shard identifier of s shard in which the index is stored. For example, metadata received with the query includes a value of the specific attribute and the online system determines an index corresponding to the value of the specific attribute included in the metadata. The online system identifies a shard identifier associated with an identifier of the determined index and retrieves item embeddings stored in the determined index from the shard corresponding to the shard identifier. From the retrieved item embeddings, the online system selects one or more item embeddings nearest to the embedding for the query in a latent space using one or more nearest neighbor processes or one or more approximate nearest neighbor processes. Hence, generating indices including item embeddings based on values of items for the specific attribute and storing the indices in shards allows the online system to more efficiently retrieve item embeddings, reducing an amount of time for the online system to identify items for a received query. Additionally, storing the generated indices in shards allows the online system to decrease an amount of data retrieved by the online system when selecting embeddings satisfying the received query, also reducing an amount of computational resources consumed by the online system to retrieve the embeddings satisfying the received query.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
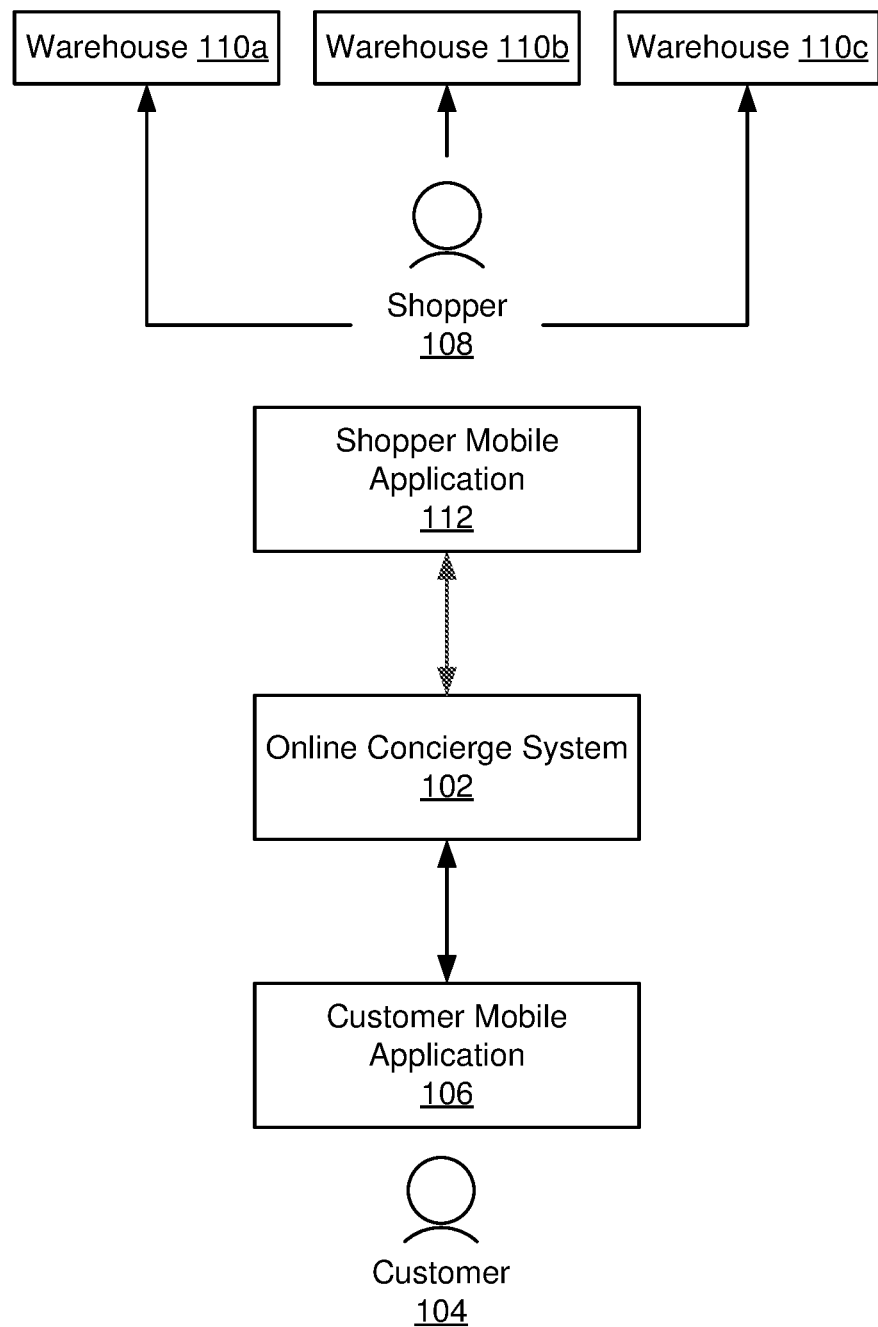
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
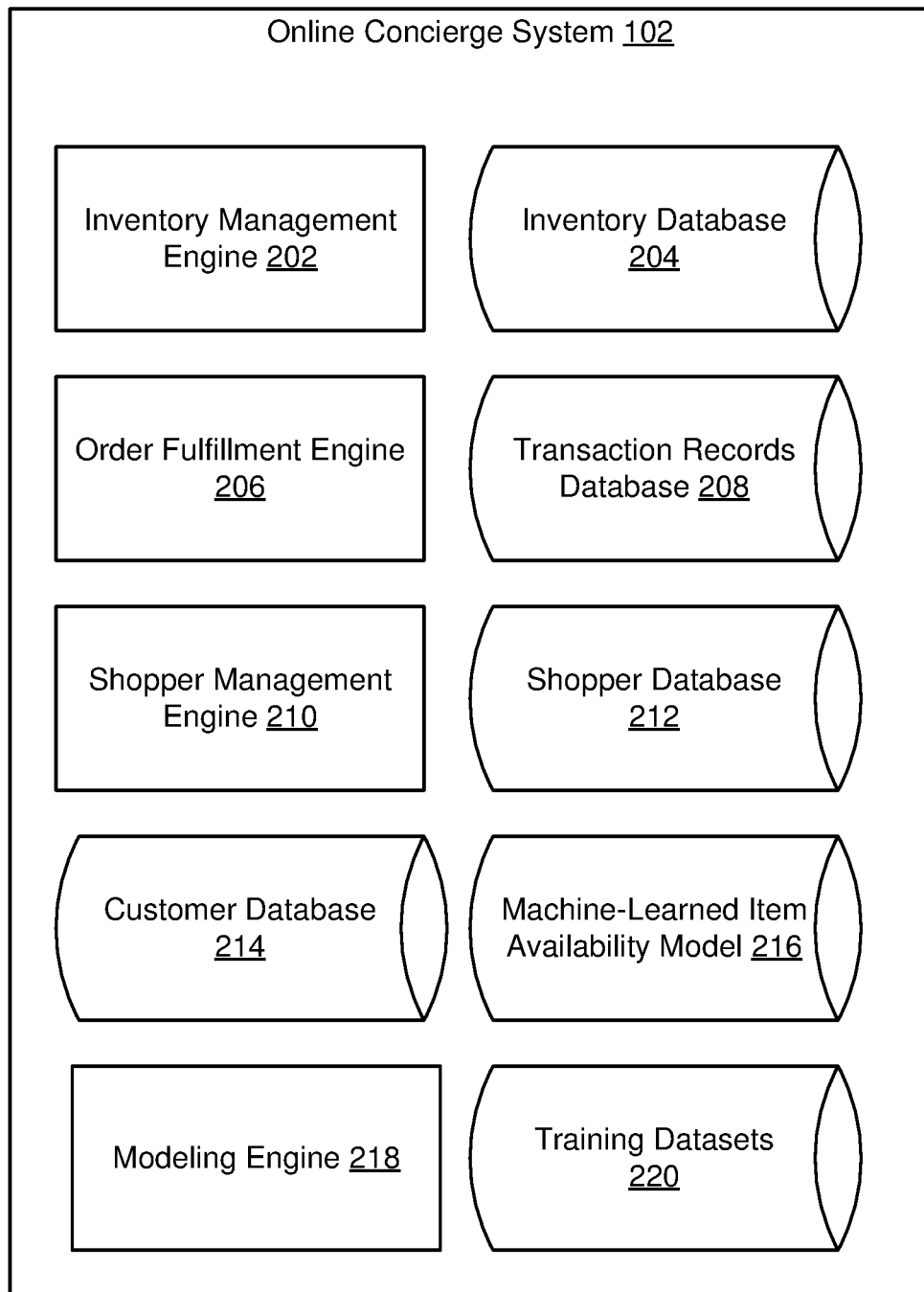
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes attributes of items that include both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

For each item, the inventory database 204 identifies one or more attributes of the item and corresponding values for each attribute of an item. For example, the inventory database 204 includes an entry for each item offered by a warehouse 110, with an entry for an item including an item identifier that uniquely identifies the item. The entry includes different fields, with each field corresponding to an attribute of the item. A field of an entry includes a value for the attribute corresponding to the attribute for the field, allowing the inventory database 204 to maintain values of different categories for various items.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 110 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with categories corresponding to levels within the taxonomy.

In various embodiments, the inventory database 204 includes item embeddings generated for items included in the inventory database 204. In various embodiments, the inventory management engine 202 or the modeling engine 218 generate the item embeddings for items, as further described below in conjunction with FIGS. 4 and 5. As the number of items included in the item database 204 increases, a number of item embeddings that are stored also increases. To reduce amounts of time for retrieving item embeddings, the online concierge system 102 generates a plurality of indices in which item embeddings are stored. As further described below in conjunction with FIGS. 4 and 6, to generate the indices, the inventory management engine 202 selects a specific attribute maintained by the inventory database 204 and generates the indices so each index corresponds to a different value of the specific attribute. An index includes item embeddings for items having a value of the specific attribute matching a value of the specific attribute corresponding to the index. As further described below in conjunction with FIGS. 4 and 6, the inventory management engine 202 may further optimize retrieval of item embeddings and scalability of item embedding storage by allocating the generated indices to different shards, as further described below in conjunction with FIGS. 4 and 6.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In various embodiments, the order fulfillment engine 206 generates and transmits a search interface to a client device of a user for display via the customer mobile application 106. The order fulfillment engine 206 receives a query comprising one or more terms from a user and retrieves items satisfying the query, such as items having descriptive information matching at least a portion of the query. In various embodiments, the order fulfillment engine 206 leverages item embeddings for items to retrieve items based on a received query. For example, the order fulfillment engine 206 generates an embedding for a query and determines measures of similarity between the embedding for the query and item embeddings for various items included in the inventory database 204.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 determines whether to delay display of a received order to shoppers for fulfillment by a time interval. In response to determining to delay the received order by a time interval, the order fulfilment engine 206 evaluates orders received after the received order and during the time interval for inclusion in one or more batches that also include the received order. After the time interval, the order fulfillment engine 206 displays the order to one or more shoppers via the shopper mobile application 112; if the order fulfillment engine 206 generated one or more batches including the received order and one or more orders received after the received order and during the time interval, the one or more batches are also displayed to one or more shoppers via the shopper mobile application 112.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g., if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times, and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
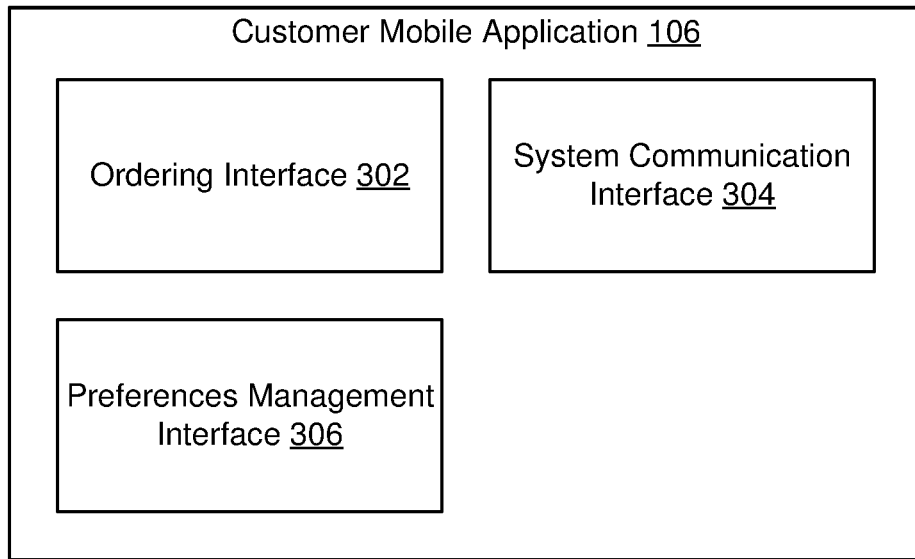
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
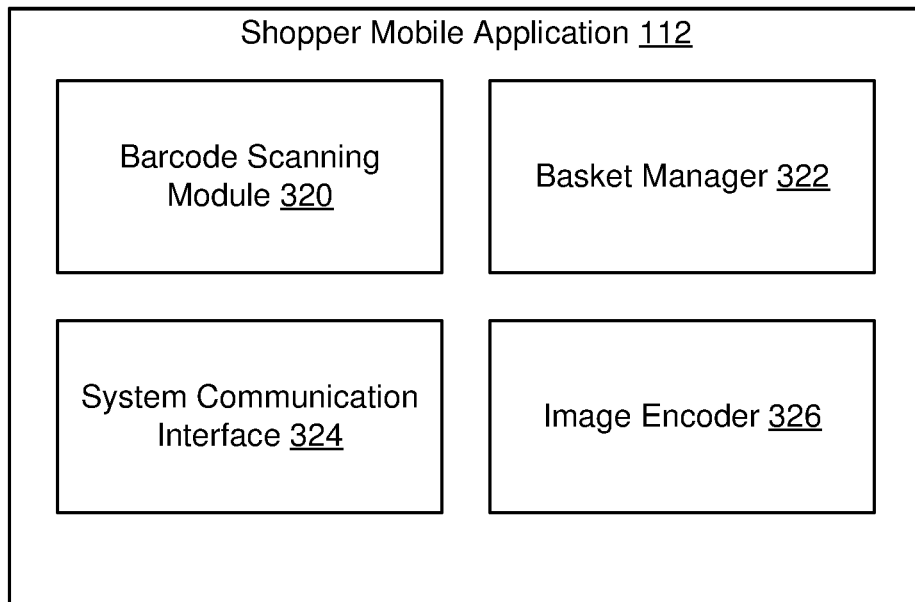
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
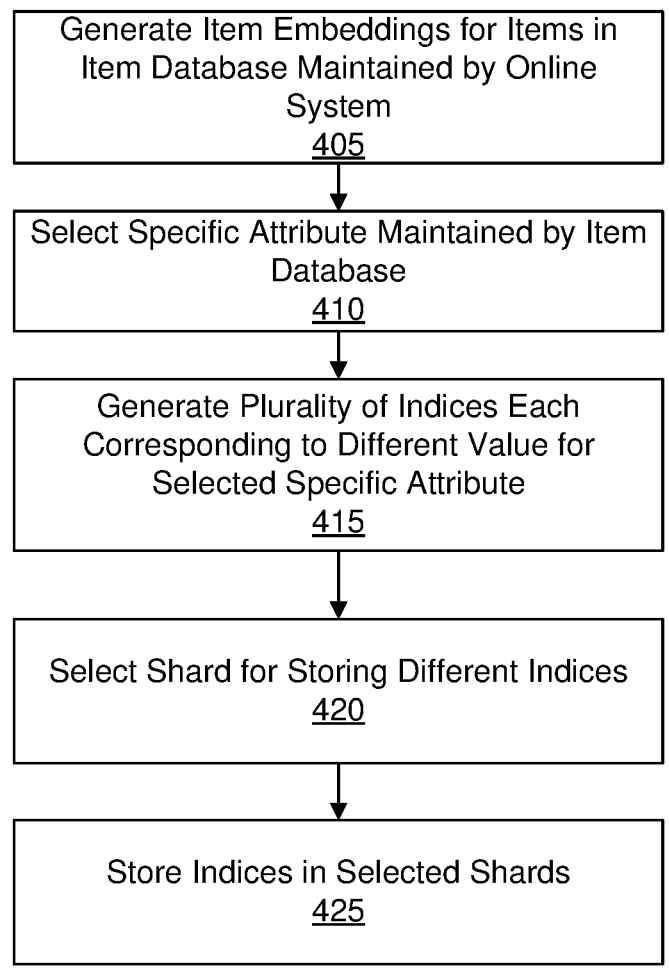
FIG. 4 is a flowchart of a method for partitioning item embeddings into multiple indices for storage by an online system, according to one embodiment.

Storing Item Embeddings in Different Indices Based on Values of a Specific Attribute for Items FIG. 4 is a flowchart of one embodiment of a method for partitioning item embeddings into multiple indices for storage by an online system. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments, while in other embodiments, the steps of the method are performed by any online system capable of retrieving items.

An online system, such as the online concierge system 102 further described above in FIGS. 1 and 2, generates 405 item embeddings for items identified in an item database stored by or accessible to the online system. In an example where the online system is an online concierge system 102, the online concierge system 102 generates 405 an item embedding for each item offered by a warehouse 110 that communicates with the online concierge system 102. In another example where the online system provides content items to users, the online system maintains item embeddings for each content item maintained by the online system or accessible to the online system. Each item embedding is associated with an item identifier that uniquely identifies an item. An item embedding represents an item as a multidimensional vector in a latent space.

Figure 5:
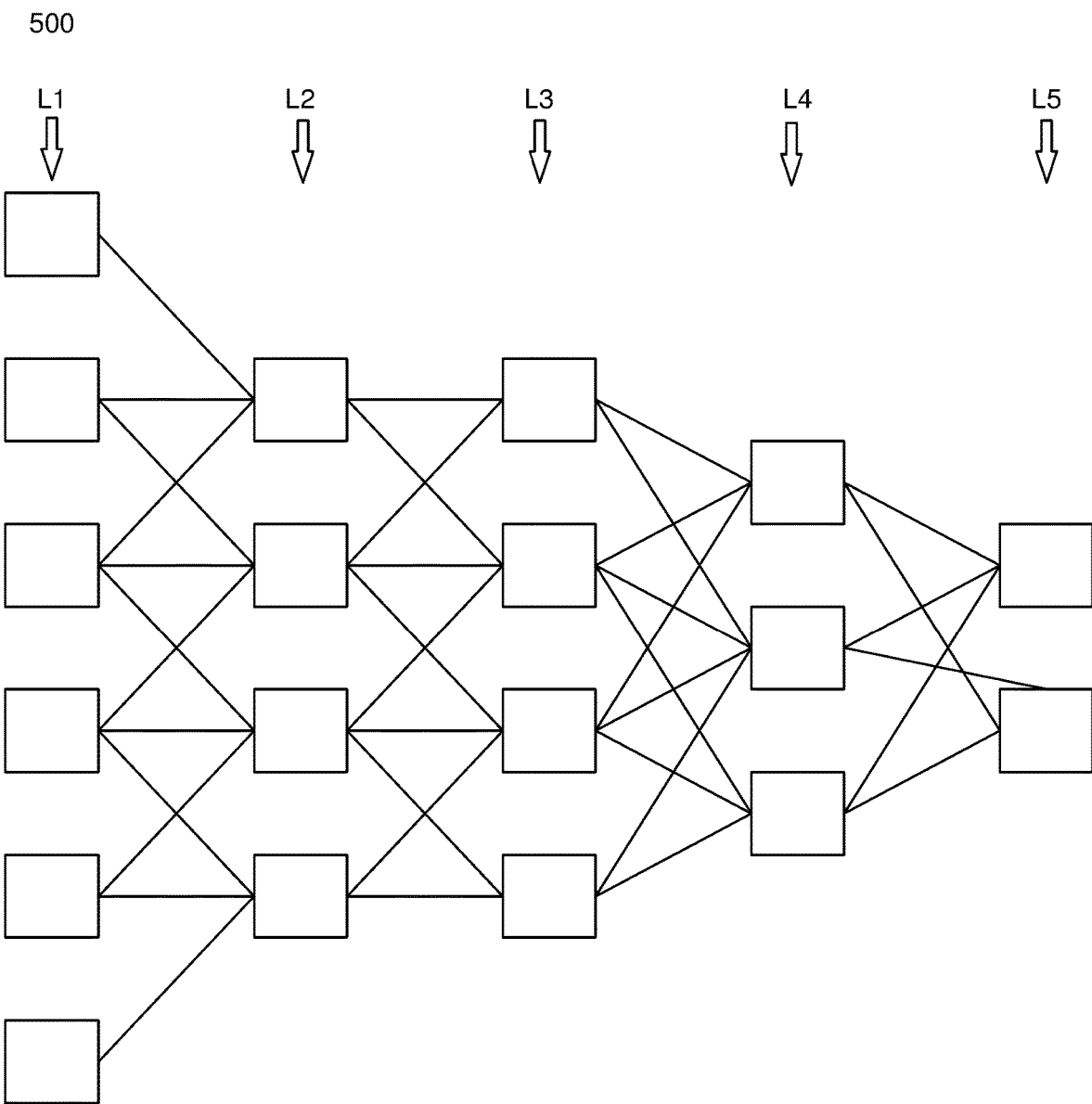
FIG. 5 is an example network model that may be used to generate an embedding for an item according to one embodiment.

FIG. 5 shows an example network model 500 that may be used to generate an embedding for an item. The network model 500 shown in FIG. 5, also referred to as a deep neural network, comprises a plurality of layers (e.g., layers L1 through L5), with each of the layers including one or more nodes. Each node has an input and an output and is associated with a set of instructions corresponding to the computation performed by the node. The set of instructions corresponding to the nodes of the network may be executed by one or more computer processors.

Each connection between nodes in the network model 500 may be represented by a weight (e.g., numerical parameter determined through a training process). In some embodiments, the connection between two nodes in the network model 500 is a network characteristic. The weight of the connection may represent the strength of the connection. In some embodiments, connections between a node of one level in the network model 500 are limited to connections between the node in the level of the network model 500 and one or more nodes in another level that is adjacent to the level including the node. In some embodiments, network characteristics include the weights of the connection between nodes of the neural network. The network characteristics may be any values or parameters associated with connections of nodes of the neural network.

A first layer of the network model 500 (e.g., layer L1 in FIG. 5) may be referred to as an input layer, while a last layer (e.g., layer L5 in FIG. 5) may be referred to an output layer. The remaining layers (layers L2, L3, L4) of the network model 500 are referred to are hidden layers. Nodes of the input layer are correspondingly referred to as input nodes; nodes of the output layer are referred to as output nodes, and nodes of the hidden layers are referred to as hidden nodes. Nodes of a layer provide input to another layer and may receive input from another layer. For example, nodes of each hidden layer (L2, L3, L4) are associated with two layers (a previous layer and a next layer). A hidden layer (L2, L3, L4) receives an output of a previous layer as input and provides an output generated by the hidden layer as an input to a next layer. For example, nodes of hidden layer L3 receive input from the previous layer L2 and provide input to the next layer L4.

The layers of the network model 500 are configured to identify one or more item embeddings of an item identified to the network model 500. For example, an output of the last hidden layer of the network model 500 (e.g., the last layer before the output layer, illustrated in FIG. 5 as layer L4) indicates one or more item embeddings of an item. An item embedding may be a high-dimensional vector indicating features of the identified item to form a feature vector for the identified item.

In some embodiments, the weights between different nodes in the network model 500 may be updated using machine learning techniques. For example, the network model 500 may be provided with training data identifying items with a label applied to each identified user. The label applied to an item may be based on interactions with the item by users of an online system. In some embodiments, the training data comprises a set of feature vectors corresponding to a specific number or specific percentage of items offered by the online system, with each feature vector of the training data associated with a corresponding label applied to each identified item. The label applied to an item indicates whether a specific interaction was performed with the item in some embodiments. Features of an item of the training set determined by the network model 500 are compared to a difference of a probability of the specific interaction being performed with the item from the output layer of the network model and the label applied to the item of the training set, and the comparison is used to modify one or more weights between different nodes in the network model 500, modifying an embedding output by the network model 500 for the item.

Referring back to FIG. 4, when the online system receives a query, the online system generates an embedding for the query that comprises a multidimensional vector representing the query in a latent space. The online system may use any suitable method for generating an embedding for the query. Example methods for generating the embedding for the query include Word2Vec, GloVE, as a layer in a neural network trained from a training set of documents or other text data, or any other suitable method. In various embodiments, item embeddings and the embedding for the query have an equal number of dimensions. Using one or more nearest neighbor or approximate nearest neighbor methods, the online concierge system selects items satisfying the query based on distances in the latent space between the embedding for the query and item embeddings corresponding to items.

As a number of items maintained by the online system increases, the online system correspondingly generates 405 an increased number of item embeddings. How the online system stores the item embeddings affects a length of time for the online system to retrieve items when a query is retrieved. To reduce an amount of time for the online system to retrieve items, the online system selects 410 a specific attribute maintained in the item database. In various embodiments, the item database includes an entry for each item, with an entry including multiple fields that each correspond to different attributes of an item and values of the different attributes of the item. The online system may use any criteria for selecting 410 the specific attribute, allowing selection of a different specific attribute in different implementations. In an example where the online system is an online concierge system 102, as further described above in conjunction with FIG. 2, the online concierge system 102 selects 410 the specific attribute as a warehouse 110 offering an item. In another example where the online system is an online concierge system 102, the online concierge system 102 selects 410 the specific attribute as a category in a taxonomy maintained by the online concierge system 102 that is associated with an item. As another example, the specific attributes is an inventory area associated with an item, with the inventory area specifying a department of one or more warehouses including the The online system uses the selected specific attribute as an index key to generate 415 a plurality of indices, with an index including item embeddings for items having a common value for the selected specific attribute. Hence, each index corresponds to a different value of the selected specific attribute and includes item embeddings for items having a specific value of the selected specific attribute. In an example where the selected specific attribute is a warehouse 110, an index includes item embeddings for items offered by a specific warehouse, while an alternative index includes item embeddings for items offered by an alternative warehouse. This allows the online system to generate 415 different indices for different warehouses 110. Similarly, the online system may generate 415 different indices for different values of any selected specific attribute.

To further increase scalability of storing the item embeddings, the online system distributes the indices across multiple shards, allowing storage of the indices to be spread across multiple storage devices or storage locations. In one embodiment, the online system selects a number of shards, which may be a predetermined value, with each shard having a corresponding shard identifier, and selects 420 a shard for storing different indices. For example, the online system identifies an index and applies a hash function to the value of the index key for the index to generate a hash code for the index, and the online system determines a shard identifier of a shard for the index as the hash code for the index modulo the number of shards. Subsequently, the online system stores 425 the index in the shard corresponding to the determined shard identifier. Any suitable hash function, such as SHA-1, may be applied to the value of the index key.

In other embodiments, after generating 415 the indices, the online system receives queries and identifies an index from which item embeddings are retrieved and compared to embeddings for the received query. For example, metadata received along with a query includes information used by the online system to identify an index key corresponding to the received query, and the online system compares an embedding for the received query to item embeddings in the index corresponding to the identified index key. The online system stores information identifying received queries and an index key corresponding to the received queries. From the stored information, the online system determines a frequency with which different indices are accessed during one or more time intervals.

When selecting 420 a shard for each index, the online system groups indices into shards based on the frequency with which the indices are accessed. In some embodiments, the online system determines a number of queries per second received for each index during a time interval to determine a frequency with which an index was accessed. For example, the online system determines 420 shards for indices so a combination of frequencies with which different indices stored 425 in a shard are accessed is within a threshold amount of a combination of frequencies with which different indices stored 425 in another shared are accessed. For example, the online system identifies a specific shard and determines an aggregate frequency of access for the specific shard as a combination (e.g., a sum) of frequencies with which the online system accessed indices stored in the specific shard. The online system identifies an additional shard and determines a combined frequency of access for the additional shard as a combination of a frequency with which the online system accessed an index and frequencies with which the online system accessed indices stored in the additional shard. In the preceding example, the online system stores 425 the index in the additional shard in response to the combined frequency of access for the additional shard being within a threshold amount of the aggregate frequency of access for the specific shard. In another example, the online system determines an aggregate frequency of access by combining the frequencies with which each index was accessed and determines a target frequency of access for each shard as a ratio of the aggregate frequency of access to the number of shards. The online system then allocates indices to a shard to a total of the frequencies of access to the indices allocated to the shard is within a threshold amount of the target frequency of access for the shard.

In some embodiments, the online system monitors frequencies with which indices are accessed over time and modifies storage of indices in different shards to balance frequencies with which different shards are accessed when queries are received. The online system may re-allocate indices among shards periodically or when a total frequency with which a shard is accessed changes by a threshold amount from a previously determined frequency with which the shard was accessed. Such re-allocation of indices among shards allows the online system to account for changes in frequencies with which different indices are accessed over time.

Figure 6:
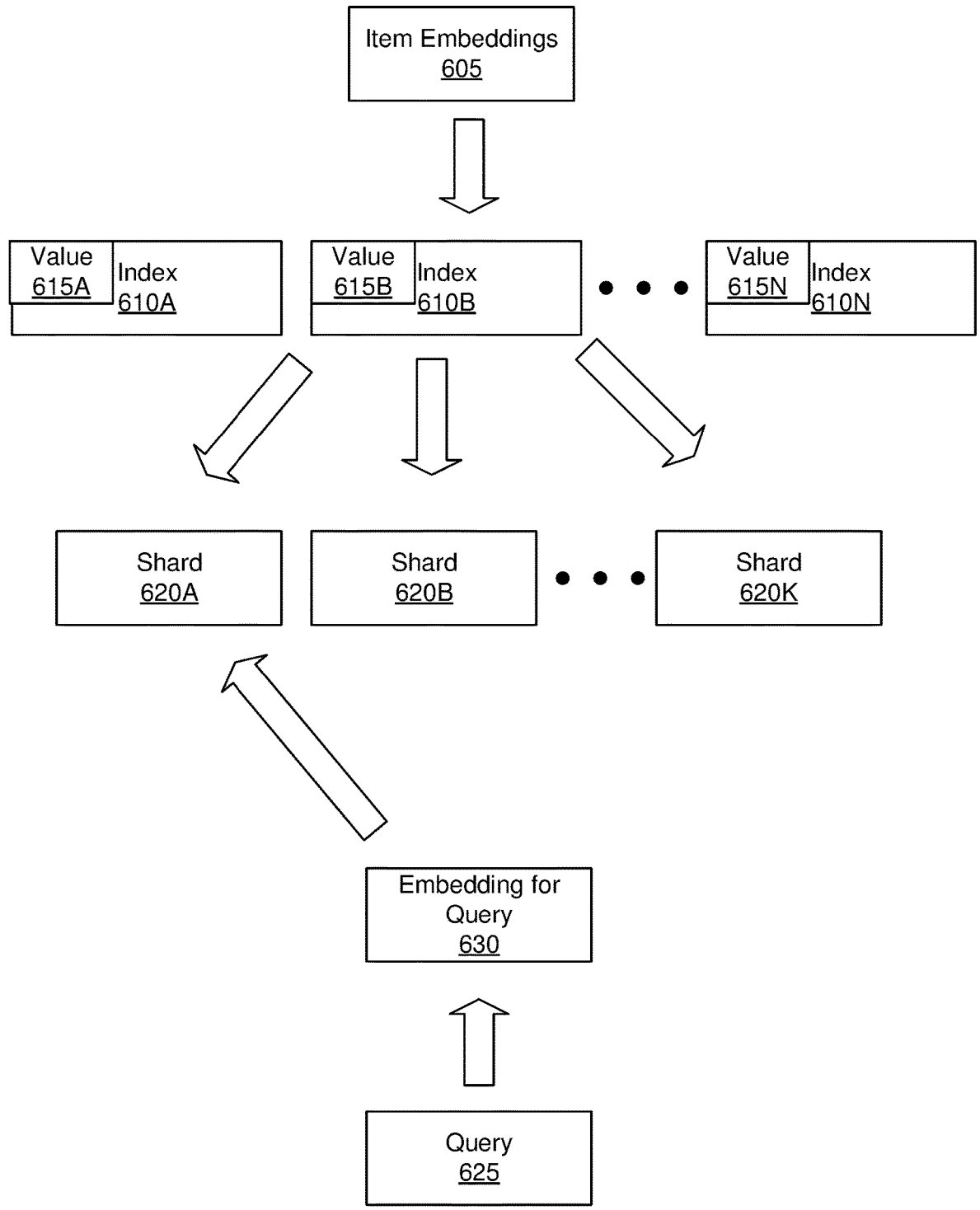
FIG. 6 is a process flow diagram of a method for storing item embeddings in different indices by an online system, according to one embodiment.

FIG. 6 is a process flow diagram of a method for storing item embeddings in different indices by an online system. In the example shown by FIG. 6, an online system generates item embeddings 605 for items identified in an item database maintained by the online system, as further described above in conjunction with FIGS. 4 and 5. To store the item embeddings 605 in a manner that expedites retrieval of item embeddings by the online system, the online system identifies a specific attribute maintained by the item database. In various embodiments, the online system stores multiple attributes for items in the item database along with values of various items for each attribute. Hence, the item database includes one or more attributes for items and stores a value for each attribute in association with the item and the attribute. The specific attribute may be predetermined by the online system or may be selected by the online system based on one or more rules.

The online system uses the specific attribute as an index key and generates different indices 610A, 610B, 610N (also referred to individually and collectively using reference number 610) that each correspond to a different value 615A, 615B, 615N (also referred to individually and collectively using reference number 615) of the specific attribute. Each index 610 includes embeddings for items having a value of the specific attribute in the item database matching the value 615 corresponding to the index. In the example of FIG. 6, index 610A corresponds to value 615A of the specific attribute and includes item embeddings 605 of items having value 615A of the specific attribute. Similarly, index 610B corresponds to value 615B of the specific attribute and includes item embeddings 605 of items having value 615B of the specific attribute, while index 610N corresponds to value 615N of the specific attribute and includes items having value 615N of the specific attribute. Different online systems may select different specific attributes of items included in an item database, allowing different online systems to tailor the number of item embeddings 605 included in different indices 610 as well as the number of indices 610 that are generated.

To further increase scalability of how item embeddings are stored, the online system distributes the indices 610 into a number of shards 620A, 620B, 620N (also referred to individually and collectively using reference number 620). The online system determines a number of shards to use based on any suitable criteria. In various embodiments, the number of shards is less than a number of indices 610 that were generated. As further described above in conjunction with FIG. 4, the online system uses the value of the specific attribute, a hash function, and the number of shards to allocate an index 610 to a shard 620 based on the value of the specific attribute for the index 610. In other embodiments, the online system accounts for a frequency with which different indices 610 are accessed by the online system to load balance accesses to different shards 620 based on the frequency with which indices stored in a shard 620 are accessed, as further described above in conjunction with FIG. 4. Hence, a shard 620 may include multiple indices 610 in various embodiments. As further described above in conjunction with FIG. 4, the online system may modify allocation of indices 610 to shards based on a frequency with which different shards are accessed, allowing the online system to load balance access to different shards 620 over time to account for changes in frequencies with which the online system retrieves item embeddings 605 from different indices 610 over time. Such load balancing of access to different shards 620 allows the online system to conserve storage resources, such as memory, allocated to different shards 620 based on frequencies with which the shards 620 are accessed. Further, the load balancing of shards 620 allows the online system to reduce latency in accessing different shards 620 when queries are accessed.

With the indices 610 stored in shards 620, when the online system receives a query 625 from a user, the online system generates an embedding 630 for the query. From metadata received in conjunction with the query 625, the online system identifies a shard 620 including an index 610 relevant to the query 625. In some embodiments, the online system maintains associations between an identifier of an index 615 and a shard identifier of s shard 620 in which the index 615 is stored. For example, metadata received with the query includes a value of the specific attribute and the online system determines an index 610 corresponding to the value 615 of the specific attribute included in the metadata. The online system identifies a shard identifier associated with an identifier of the determined index 610 and retrieves item embeddings 605 stored in the determined index 610 from the shard 620 corresponding to the shard identifier. From the retrieved item embeddings 605, the online system selects one or more item embeddings 605 nearest to the embedding 630 for the query in a latent space using one or more nearest neighbor processes or one or more approximate nearest neighbor processes. Hence, generating indices 610 including item embeddings 605 based on values 615 of items for the specific attribute and storing the indices 610 in shards 620 allows the online system to more efficiently retrieve item embeddings 605, reducing an amount of time for the online system to identify items for a received query 625. Additionally, storing the indices 610 generated indices in shards 620 allows the online system to decrease an amount of data retrieved by the online system when selecting item embeddings 605 in response to a query, also reducing an amount of computational resources consumed by the online system when retrieving item embeddings 605 satisfying the query 625 from one or more indices 610.

System Architecture

Figure 7:
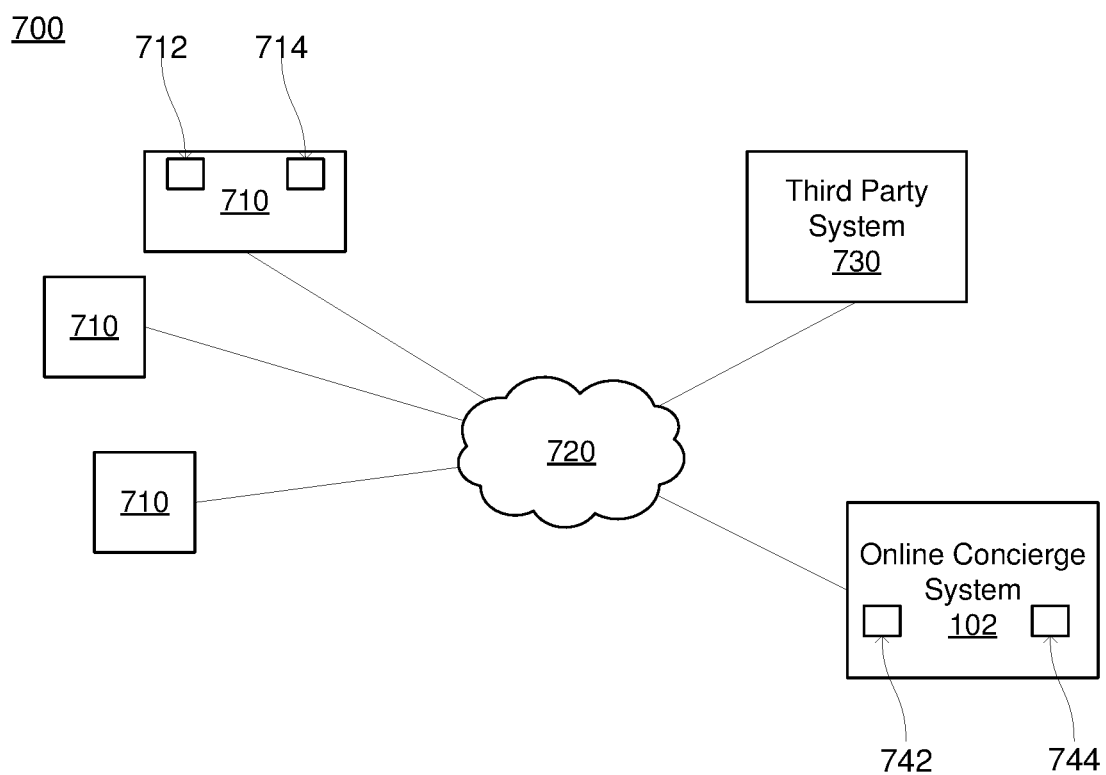
FIG. 7 is a block diagram of a system environment for an online system, such as an online concierge system, according to one embodiment.

FIG. 7 is a block diagram of a system environment 700 for an online system, such as the online concierge system 102 further described above in conjunction with FIGS. 1 and 2. The system environment 700 shown by FIG. 7 comprises one or more client devices 710, a network 720, one or more third-party systems 730, and the online concierge system 102. In alternative configurations, different and/or additional components may be included in the system environment 700.

The client devices 710 are one or more computing devices capable of receiving user input as well as transmitting and/or receiving data via the network 720. In one embodiment, a client device 710 is a conventional computer system, such as a desktop or a laptop computer. Alternatively, a client device 710 may be a device having computer functionality, such as a personal digital assistant (PDA), a mobile telephone, a smartphone, or another suitable device. A client device 710 is configured to communicate via the network 720. In one embodiment, a client device 710 executes an application allowing a user of the client device 710 to interact with the online concierge system 102. For example, the client device 610 executes a customer mobile application 106 or a shopper mobile application 112, as further described above in conjunction with FIGS. 3A and 3B, respectively, to enable interaction between the client device 710 and the online concierge system 102. As another example, a client device 710 executes a browser application to enable interaction between the client device 710 and the online concierge system 102 via the network 720. In another embodiment, a client device 710 interacts with the online concierge system 102 through an application programming interface (API) running on a native operating system of the client device 610, such as IOS® or ANDROID™.

A client device 710 includes one or more processors 712 configured to control operation of the client device 710 by performing functions. In various embodiments, a client device 710 includes a memory 714 comprising a non-transitory storage medium on which instructions are encoded. The memory 714 may have instructions encoded thereon that, when executed by the processor 712, cause the processor to perform functions to execute the customer mobile application 106 or the shopper mobile application 112 to provide the functions further described above in conjunction with FIGS. 3A and 3B, respectively.

The client devices 710 are configured to communicate via the network 720, which may comprise any combination of local area and/or wide area networks, using both wired and/or wireless communication systems. In one embodiment, the network 720 uses standard communications technologies and/or protocols. For example, the network 720 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 620 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 720 may be represented using any suitable format, such as hypertext markup language (HTML) or extensible markup language (XML). In some embodiments, all or some of the communication links of the network 720 may be encrypted using any suitable technique or techniques.

One or more third party systems 730 may be coupled to the network 720 for communicating with the online concierge system 102 or with the one or more client devices 710. In one embodiment, a third party system 730 is an application provider communicating information describing applications for execution by a client device 710 or communicating data to client devices 710 for use by an application executing on the client device. In other embodiments, a third party system 730 provides content or other information for presentation via a client device 710. For example, the third party system 730 stores one or more web pages and transmits the web pages to a client device 710 or to the online concierge system 102. The third party system 730 may also communicate information to the online concierge system 102, such as advertisements, content, or information about an application provided by the third party system 730.

The online concierge system 102 includes one or more processors 742 configured to control operation of the online concierge system 102 by performing functions. In various embodiments, the online concierge system 102 includes a memory 744 comprising a non-transitory storage medium on which instructions are encoded. The memory 744 may have instructions encoded thereon corresponding to the modules further described above in conjunction with FIG. 2 that, when executed by the processor 742, cause the processor to perform the functionality further described above in conjunction with FIG. 2 or FIGS. 4-6. For example, the memory 744 has instructions encoded thereon that, when executed by the processor 742, cause the processor 742 to generate item embeddings for items offered by the online concierge system 102 and to generate a plurality of indices, with an index including item embeddings for items having a common value of a specific attribute, as further described above in conjunction with FIGS. 4-6. Additionally, the online concierge system 102 includes a communication interface configured to connect the online concierge system 102 to one or more networks, such as network 720, or to otherwise communicate with devices (e.g., client devices 710) connected to the one or more networks.

One or more of a client device, a third party system 730, or the online concierge system 102 may be special purpose computing devices configured to perform specific functions, as further described above in conjunction with FIGS. 2-6, and may include specific computing components such as processors, memories, communication interfaces, and/or the like.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
generating item embeddings for each of a plurality of items maintained in an item database by an online system, each item embedding representing an item in a latent space of a neural network, each item embedding being a latent space vector generated by the neural network;
storing values of a specific attribute in the item database, wherein each value of the specific attribute is associated with one of the plurality of items maintained in the item database;
generating a plurality of indices, each index corresponding to a particular value of the specific attribute and including item embeddings for items having the particular value for the specific attribute, different indices corresponding to different particular values;
distributing the plurality of indices across a plurality of shards to increase scalability of storing the item embeddings, wherein distributing the plurality of indices across the plurality of shards comprises:
  determining frequencies with which the plurality of indices are accessed by the online system in response to item queries received by the online system;
  selecting a shard to include an index of the plurality of indices based on the frequencies of the plurality of indices to load balance accesses to the plurality of shards, wherein selecting the shard to include the index of the plurality of indices comprises:
    determining an aggregate frequency of access to the indices by combining frequencies with which each index was accessed,
    determining a target frequency of access for each shard as a ratio of the aggregate frequency of access to a number of shards, and
    selecting the shard to include the index of the plurality of indices so a combination of frequencies with which the online system accesses indices within the shard is within a threshold amount of the target frequency of access; and
  storing the index of the plurality of indices in the selected shard;
storing the plurality of shards; and
receiving requests for retrieving a plurality of the item embeddings based on the plurality of indices, wherein retrieving the plurality of the item embeddings comprises retrieving the plurality of shards that are load balanced based on the frequencies of the plurality of indices.

2. The method of claim 1, wherein selecting the shard to include the index of the plurality of indices comprises:
determining a number of shards;
generating a hash code for the index of the plurality of indices by applying a hash function to the particular value of the specific attribute corresponding to the index of the plurality of indices; and
determining a shard identifier of the shard to include the index of the plurality of indices as the hash code for the index of the plurality of indices modulo the number of shards.

3. The method of claim 1, wherein selecting the shard to include the index of the plurality of indices comprises:
identifying a specific shard;
determining an aggregate frequency of access for the specific shard as a combination of frequencies with which indices stored in the specific shard were accessed by the online system;
identifying an additional shard;
determining a combined frequency of access for the additional shard as a combination of a frequency with which the index of the plurality of indices was accessed by the online system and frequencies with which shards stored in the additional shard were accessed by the online system; and
selecting the additional shard to include the index of the plurality of indices in response to the combined frequency of access for the additional shard being within a threshold amount of the aggregate frequency of access for the specific shard.

4. The method of claim 1, wherein the specific attribute comprises a warehouse associated with one or more items.

5. The method of claim 1, wherein the specific attribute comprises an inventory area associated with one or more items.

6. The method of claim 1, further comprising:
receiving, at the online system, a query;
identifying an index based on metadata received in conjunction with the query;
retrieving the identified index from a shard including the identified index;
generating an embedding for the query; and
comparing the embedding for the query to item embeddings included in the identified index.

7. A computer program product comprising a non-transitory computer readable storage medium having instructions encoded thereon that, when executed by a processor, cause the processor to:
generate item embeddings for each of a plurality of items maintained in an item database by an online system, each item embedding representing an item in a latent space of a neural network, each item embedding being a latent space vector generated by the neural network;
store values of a specific attribute in the item database, wherein each value of the specific attribute is associated with one of the plurality of items maintained in the item database;
generate a plurality of indices, each index corresponding to a particular value of the specific attribute and including item embeddings for items having the particular value for the specific attribute, different indices corresponding to different particular values; and
distribute the plurality of indices across a plurality of shards to increase scalability of storing the item embeddings, wherein distributing the plurality of indices across the plurality of shards comprises:
  determine frequencies with which the plurality of indices are accessed by the online system in response to item queries received by the online system;
  select a shard to include an index of the plurality of indices based on the frequencies of the plurality of indices to load balance accesses to the plurality of shards, wherein selecting the shard to include the index of the plurality of indices comprises:
    determining an aggregate frequency of access to the indices by combining frequencies with which each index was accessed,
    determining a target frequency of access for each shard as a ratio of the aggregate frequency of access to a number of shards, and
    selecting the shard to include the index of the plurality of indices so a combination of frequencies with which the online system accesses indices within the shard is within a threshold amount of the target frequency of access; and store the index of the plurality of indices in the selected shard;
store the plurality of shards; and
receive requests for retrieving a plurality of the item embeddings based on the plurality of indices, wherein retrieving the plurality of the item embeddings comprises retrieving the plurality of shards that are load balanced based on the frequencies of the plurality of indices.

8. The computer program product of claim 7, wherein selecting the shard to include the index of the plurality of indices comprises:
determining a number of shards;
generating a hash code for the index of the plurality of indices by applying a hash function to the particular value of the specific attribute corresponding to the index of the plurality of indices; and
determining a shard identifier of the shard for the index of the plurality of indices as the hash code for the index of the plurality of indices modulo the number of shards.

9. The computer program product of claim 7, wherein selecting the shard to include the index of the plurality of indices comprises:
identifying a specific shard;
determining an aggregate frequency of access for the specific shard as a combination of frequencies with which indices stored in the specific shard were accessed by the online system;
identifying an additional shard;
determining a combined frequency of access for the additional shard as a combination of a frequency with which the index of the plurality of indices was accessed by the online system and frequencies with which shards stored in the additional shard were accessed by the online system; and
selecting the additional shard to include the index of the plurality of indices in response to the combined frequency of access for the additional shard being within a threshold amount of the aggregate frequency of access for the specific shard.

10. The computer program product of claim 7, wherein the specific attribute comprises a warehouse associated with one or more items.

11. The computer program product of claim 7, wherein the specific attribute comprises an inventory area associated with one or more items.

12. The computer program product of claim 7, wherein the non-transitory computer readable storage medium further has instructions encoded thereon that, when executed by the processor, cause the processor to:
receive, at the online system, a query;
identify an index based on metadata received in conjunction with the query;
retrieve the identified index from a shard including the identified index;
generate an embedding for the query; and
compare the embedding for the query to item embeddings included in the identified index.

13. A system comprising:
a processor;
a non-transitory computer readable storage medium coupled to the processor and having instructions encoded thereon that, when executed by the processor, cause the processor to:
generate item embeddings for each of a plurality of items maintained in an item database by an online system, each item embedding representing an item in a latent space of a neural network, each item embedding being a latent space vector generated by the neural network;
store values of a specific attribute in the item database, wherein each value of the specific attribute is associated with one of the plurality of items maintained in items maintained by the online system from attributes of items maintained by the item database;
generate a plurality of indices, each index corresponding to a particular value of the specific attribute and including item embeddings for items having the particular value for the specific attribute, different indices corresponding to different particular values; and
distribute the plurality of indices across a plurality of shards to increase scalability of storing the item embeddings, wherein distributing the plurality of indices across the plurality of shards comprises:
determine frequencies with which the plurality of indices are accessed by the online system in response to item queries received by the online system;
select a shard to include an index of the plurality of indices based on the frequencies of the plurality of indices to load balance accesses to the plurality of shards, wherein selecting the shard to include the index of the plurality of indices comprises:
determining an aggregate frequency of access to the indices by combining frequencies with which each index was accessed,
determining a target frequency of access for each shard as a ratio of the aggregate frequency of access to a number of shards, and
selecting the shard to include the index of the plurality of indices so a combination of frequencies with which the online system accesses indices within the shard is within a threshold amount of the target frequency of access; and
store the index of the plurality of indices in the selected shard;
store the plurality of shards; and
receive requests for retrieving a plurality of the item embeddings based on the plurality of indices, wherein retrieving the plurality of the item embeddings comprises retrieving the plurality of shards that are load balanced based on the frequencies of the plurality of indices.

14. The system of claim 13, wherein selecting the shard to include the index of the plurality of indices comprises:
determining a number of shards;
generating a hash code for the index of the plurality of indices by applying a hash function to the particular value of the specific attribute corresponding to the index of the plurality of indices; and
determining a shard identifier of the shard for the index of the plurality of indices as the hash code for the index of the plurality of indices modulo the number of shards.

15. The system of claim 13, wherein selecting the shard to include the index of the plurality of indices comprises:
identifying a specific shard;
determining an aggregate frequency of access for the specific shard as a combination of frequencies with which indices stored in the specific shard were accessed by the online system;
identifying an additional shard;
determining a combined frequency of access for the additional shard as a combination of a frequency with which the index of the plurality of indices was accessed by the online system and frequencies with which shards stored in the additional shard were accessed by the online system; and selecting the additional shard to include the index of the plurality of indices in response to the combined frequency of access for the additional shard being within a threshold amount of the aggregate frequency of access for the specific shard.

16. The system of claim 13, wherein the specific attribute comprises a warehouse associated with one or more items.

17. The system of claim 13, wherein the non-transitory computer readable storage medium further has instructions encoded thereon that, when executed by the processor, cause the processor to:

receive, at the online system, a query;

identify an index based on metadata received in conjunction with the query;

retrieve the identified index from a shard including the identified index;

generate an embedding for the query; and compare the embedding for the query to item embeddings included in the identified index.

\* \* \* \* \*